3,146,822
FLAME DETECTION SYSTEM USING OSCILLATING ELEMENT
William A. Ray, North Hollywood, Calif., assignor to International Telephone and Telegraph Corporation, Baltimore, Md., a corporation of Maryland
Continuation of application Ser. No. 354,273, May 11, 1953. This application Sept. 9, 1960, Ser. No. 57,102
5 Claims. (Cl. 158—28)

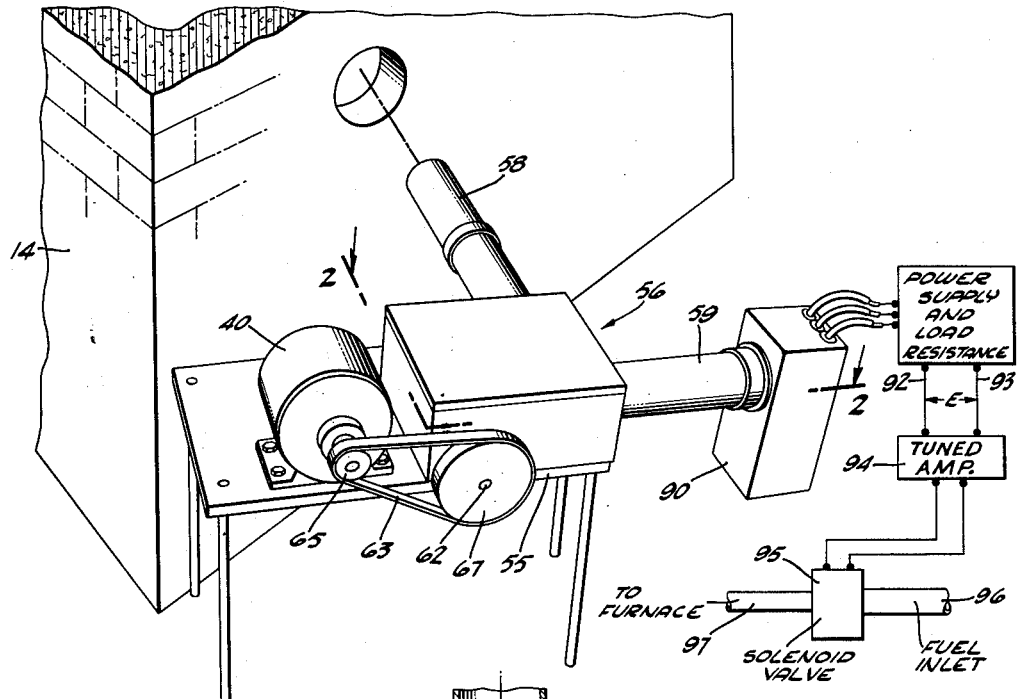
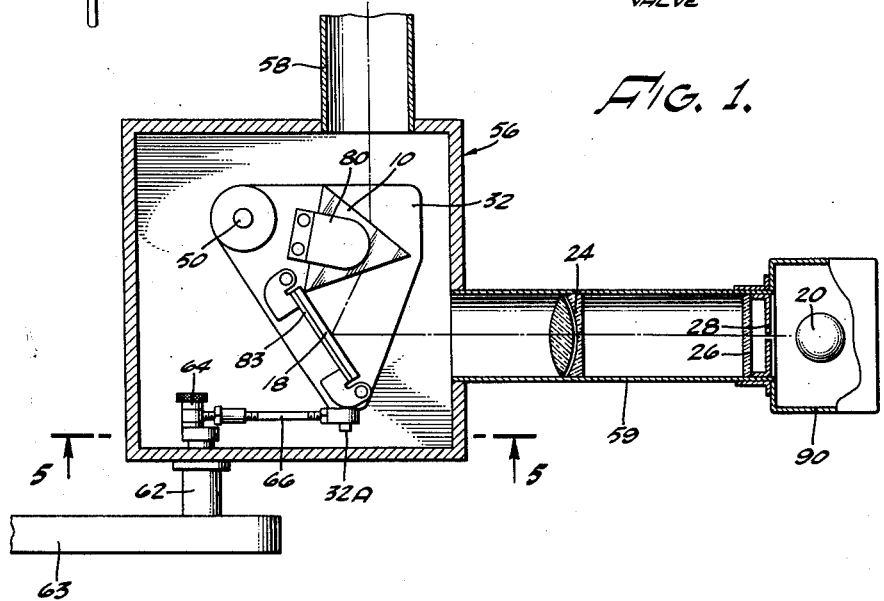
Fig. 1.
Fig. 2.
WILLIAM A. RAY
INVENTOR.
BY Lyon & Lyon
ATTORNEYS Sept. 1, 1964 W. A. RAY 3,146,822
FLAME DETECTION SYSTEM USING OSCILLATING ELEMENT
Original Filed May 11, 1953 2 Sheets-Sheet 2
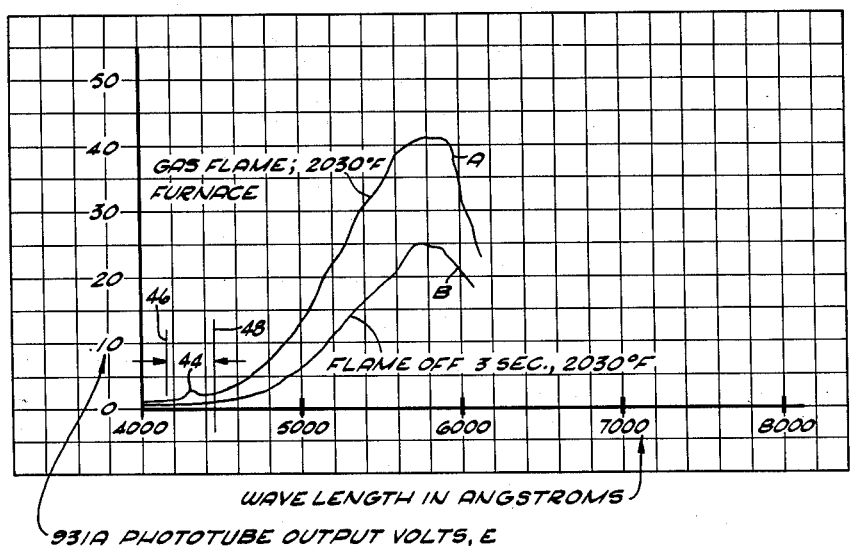
FIG. 3.
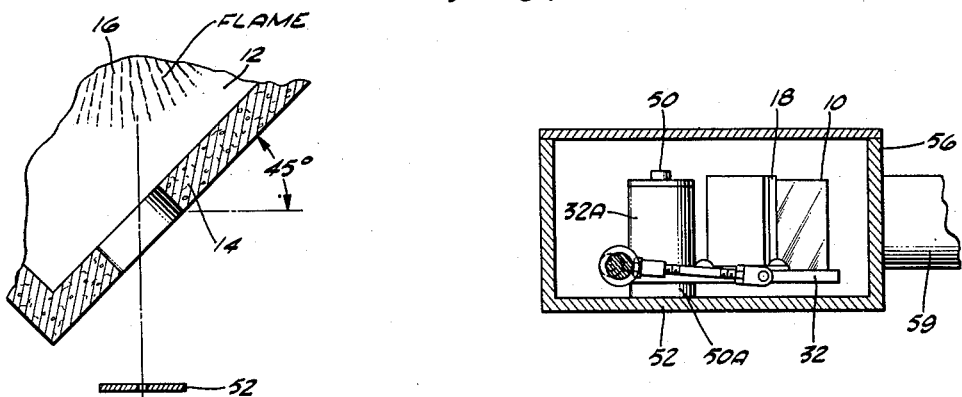
FIG. 4.
FIG. 5.
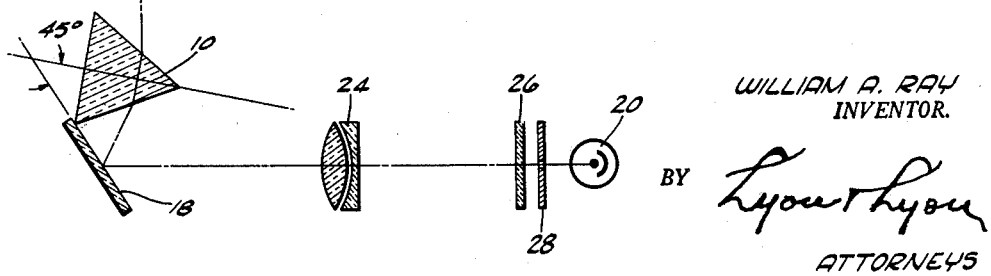
WILLIAM A. RAY
INVENTOR.
BY Lyon+Lyon
ATTORNEYS United States Patent Office — 3,146,822 — Patented Sept. 1, 1964

The present invention relates to improved means and techniques for detecting the presence of a flame and for controlling the flow of fuel to such flame. The present application is a continuation of my pending application Serial No. 354,273, filed May 11, 1953.

More specifically, the present invention relates to means and techniques for detecting the presence of a flame in an environment, such as in industrial furnaces, where the radiation from the firebrick of the furnace is likely to obscure the determinations.

It is realized that existing methods of flame detection have serious limitations as to operating life, temperature, and response time. In order to overcome these limitations, the means and techniques which comprise the present invention are characterized by the fact that (1) no part of the detector is in contact with the flame, (2) the detector produces an indication of a no-flame condition within a relatively short time, i.e., within five seconds, after the flame is extinguished, thus being insensitive to the radiation from the high temperature firebrick of the furnace, and (3) the detector is stable and has a relatively long operating life.

Briefly, the present invention involves the use of a radiation dispersion element, such as a prism, to produce a spectrum of the incident radiation. A selected portion of such spectrum wherein there is a characteristic emission band of the flame is repeatedly scanned to produce a cyclically varying quantity, such quantity being amplified to produce a control operation, such as, for example, to control the flow of fuel to the flame. In general, such scanning is achieved by oscillating the prism itself through a relatively small angle for purposes of directing incremental portions of the selected region of the spectrum onto a photoelectric cell which, in effect, measures the intensity of the radiation impinging on such cell to produce a voltage representative of such intensity; and since the prism is oscillated, the voltage varies in accordance with the change in intensity of the particular emission band which is scanned. By these means, a cyclically varying quantity is produced which is independent of the firebrick temperature of the furnace. Should the flame be extinguished, there is, of course, no emission band and hence no cyclically varying quantity; and likewise, should there be a defect in the mechanism intended to oscillate the prism, there is likewise no cyclically varying quantity and the detector in such case "fails safe." It is, therefore, an object of the present invention to provide means and techniques of the characters indicated above for achieving the indicated results.

A specific object of the present invention is to provide improved means and techniques involving apparatus for distinguishing or discriminating radiation, on the one hand, from the flame itself and, on the other hand, the radiation from a body heated by such flame, i.e., for example, the firebrick of a furnace.

Another specific object of the present invention is to provide improved means and techniques of this character involving apparatus which produces a quantity representative of the presence of a flame and independent of ambient conditions.

Another specific object of the present invention is to provide improved means and techniques of this character involving apparatus which produces a cyclically varying quantity which is truly indicative of the presence of a flame and which is not influenced to any appreciable extent by sporadic fluctuations in the intensity of the flame and which is influenced in no appreciable amount by the fundamental or harmonic frequency of the power supply associated with such apparatus.

Another specific object of the present invention is to provide improved means and techniques of this character involving apparatus for obtaining what may be termed broadly as a differential effect between, on the one hand, the radiation from the flame itself, and on the other hand, the radiation from the firebrick of the furnace.

Another specific object of the present invention is to provide means and techniques of this character involving apparatus for producing a cyclically varying quantity which represents the difference in radiation from, on the one hand, the flame itself, and on the other hand, the radiation from the ambient firebrick.

Another specific object of the present invention is to provide an arrangement of this character which fails safe.

Another specific object of the present invention is to provide an arrangement of this character which is quick to respond to an extinguishment of the flame so that subsequent escape of the gas into the preheated furnace does not result in a dangerous condition wherein such gas is likely to cause an explosion.

Another specific object of the present invention is to provide apparatus of this character which scans or traverses a characteristic band in the spectrum of the flame itself, with the scanning being accomplished recurrently to produce a corresponding cyclical varying voltage which may be used for indication or control purposes.

Another specific object of the present invention is to provide improved means and techniques of this character involving apparatus for obtaining a response which is specific to the flame only.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is a perspective view showing apparatus incorporating novel means for practicing novel concepts presented herein, the apparatus being shown in perspective and lined with an aperture in a furnace for viewing conditions therein to produce a control voltage for controlling the flow of fuel to such furnace.

FIGURE 2 is a view partly in section and partly in elevation of the apparatus illustrated in FIGURE 1, the section being an irregular section taken substantially on the line 2—2 of FIGURE 1.

FIGURE 3 shows two curves, curve A and curve B, the abscissae of points on such curves being measured in terms of the wave length of the radiation emanating from the furnace, in Angstrom units, while the ordinates of the points on such curves are measured in terms of output voltage of the photoelectric cell illustrated in FIGURE 2. These two curves A and B represent measurements under static conditions, i.e., measurements made when the prism illustrated in FIGURE 2 is in a stationary position, being oriented differently, however, for each static measurement. As indicated, curve A represents the spectral distribution of radiation from the furnace with the gas flame ignited and the firebrick of the furnace heated by such gas flame to a temperature of 2030° F.; whereas curve B represents the spectral distribution of radiation from the same furnace, three seconds after the gas flame is extinguished.

FIGURE 4 shows elements of the optical system incorporated in the apparatus illustrated in FIGURE 1.

FIGURE 5 is a sectional view taken substantially on the line 5—5 of FIGURE 2.

The apparatus illustrated in the drawings includes a prism 10 arranged to receive incident radiation from the interior 12 of the furnace 14 heated by the gas flame 16. The incident radiation, after being dispersed by the prism 10 into a spectrum, is reflected from the mirror 18 onto the photoelectric cell 20, an achromatic lens 24, filter 26 and the slit plate 28 being interposed in turn, between the mirror 18 and photocell 20 so that a relatively small incremental portion of the spectrum passes through the slit in plate 28 or to the photocell 20. The prism 10 and mirror 18 are mounted as a unit on the mounting plate 32 which is oscillated at a relatively high speed, as described more fully hereinafter, by the driving motor 40 (FIGURE 1), the mounting plate 32 and the prism 10 and mirror 18 are thus oscillated through an angle of approximately one-half of one degree so that incremental portions of a selected region of the spectrum are directed through the slit plate 28 on to the photocell 20. In accordance with an important feature of the present invention, the selected portion of the spectrum is a region in the spectrum wherein the intensity of radiation from the flame changes rather abruptly with relatively little change in frequency, such as an emission band of the flame which results in the spectral distribution curve A in FIGURE 3 to have the pronounced "hump" 44, the maximum of such hump occurring at 4315 Angstrom units which is the center of an emission band of the gas flame.

The optical system is so arranged that only those frequencies included between the limits 46 and 48 in FIGURE 3 (which include the hump 44) are successively directed, in incremental amounts, onto the photocell 20. Thus, in effect, oscillation of the prism and mirror system 10, 18 results in a scanning of that portion of the spectrum containing the hump 44.

Preferably the optical system includes a second slit plate 52 interposed between the source of radiation and the prism 10 as shown in FIGURE 4; and preferably includes the filter 26 which assures the nonpassage of radiation having a wave length greater than, for example, 4600 Angstrom units, thereby definitely precluding from the determinations the high radiation intensities existing at, for example, 5800 Angstrom units.

The mounting plate 32 is mounted for oscillatory movement about the vertical axis of the spindle 50 which has its lower end provided with an enlarged bearing shoulder 50A, such spindle 50 being stationarily mounted on the base 52 which in turn is mounted on the supporting table 55. The base 52 comprises the bottom plate of a light-tight rectangular box 56 from which extends the radiation inlet and outlet tubes 58 and 59, respectively. The supporting plate 32 is provided with the cylindrical portion 32A which is a bearing member and cooperates with the spindle 50, with relatively close tolerances to permit precise oscillatory movement of the supporting plate 32.

The plate 32 is oscillated using a crank structure which is now described. The motor 40 drives the shaft 62, which is journalled for rotation in one side wall of the rectangular box 56 through a flexible belt 63 which passes over, on the one hand, the pulley 65 on the motor shaft, and on the other hand, over the pulley 67 on shaft 62. The inner end of shaft 62 mounts a shouldered offset pin or shaft 64 which pivotally supports one end of the connecting rod 66, the other end of the rod 66 being pivotally supported on the shaft 32A of the mounting plate 32. By these means, it is clear that rotation of the shaft 32 produces an oscillatory movement of the mounting plate 32 in the horizontal plane.

Suitable means are used to secure the prism 10 and the mirror 18 on the oscillatory plate 32. Such means may, for example, comprise a Z-shaped clamping plate 80 which has its lower portion secured to the mounting plate 32 with the prism 10 sandwiched between the mounting plate 32 and the clamping member 80. Also, the mirror 18 may, for example, be cemented to the backing plate 83 which has its ends secured to the mounting plate 32.

The slit plate 52, as well as the slit plate 28, are circular, as well as the filter element 26, and are all secured within their respective cylindrical tubes 58 and 59, respectively. Likewise the achromatic lens 24 is secured within the tube 59 so as to focus the dispersed radiation onto the cathode of the photocell 20.

Preferably the photocell 20 is of the 931A type and is mounted within the light-tight rectangular box 90 in communication, of course, with the tube 59.

The tube 20 is connected in conventional manner with a suitable conventional power supply and load circuit, as represented in FIGURE 1, to develop a voltage across the resistance, such voltage appearing across the output leads 92 and 93, and is represented by E, such voltage E is applied to the input terminals of an amplifier 94. The output circuit of the amplifier 94 is coupled to indicating or controlling means such as the solenoid valve 95, such valve 95 serving to control the flow of fuel from the inlet line 96 to the outlet line 97 which conducts the fuel to the flame 16 in the furnace 14. The solenoid valve 95 is energized so long as the flame burns and produces the so-called hump 44 in the curve A in FIGURE 3. When the flame is extinguished for some reason or other, the hump 44, which is representative of the 4315 emission band, disappears shortly thereafter as clearly indicated in curve B in FIGURE 3, with the result that substantially no control voltage is applied to the solenoid valve 95, in which case such valve is allowed to close under the influence of spring means normally associated with a solenoid valve of this character, thereby preventing the flow of gas to the furnace.

The prism 10 is oscillated through a total angular distance of approximately ½° at a frequency of approximately eleven cycles per second. The slit widths may be in the order of .05 or ½ millimeter.

It is noted that in one revolution of the motor shaft one scan occurs, namely the scan may be either from the limit 46 to the limit 48 or from the limit 48 to the limit 46 in FIGURE 3. The terms "scan" and "scanning," as used herein, thus refer to one movement between these limits. It is noted further that the motor 40 causes a repeated scanning since it serves to continuously rotate the shaft 32 carrying the offset pin or shaft 64. It is understood that in one scan between the limits 46 and 48 as shown in FIGURE 3, the intensity of the radiation impinging on the photocell increases to a maximum and then decreases to produce a voltage variation corresponding to the shape of the so-called hump 44. This voltage variation produced during one scan has a cyclical variation imparted thereto due to the fact that the shaft 62 continuously rotates, i.e., there is a continuous scanning. It is understood that under these conditions the voltage variation has a cyclical variation which is two times the oscillating frequency of the prism.

While it is preferred to scan across the complete hump 44, satisfactory results may be obtained when the oscillation of the prism causes only a portion of such hump to be scanned. Thus, for example, if scanning were accomplished from a frequency corresponding to the maximum of the hump, namely, 4350 Angstrom units, to either one of the two limits 46, 48, the cyclical variation imparted to the voltage variation is equal to the oscillation frequency of the prism.

In either case, it is preferred that the cyclical voltage variation be relatively high in relationship to the average frequency of sporadic fluctuations of intensity of the flame, and that such oscillation frequency be sufficiently removed from a fundamental or a harmonic of neighboring supply circuits such as commercial power frequency of 60 cycles. Also, the amplifier is preferably tuned or peaked at a frequency which is substantially equal to the cyclical variation imparted to the voltage E, thereby providing some discriminatory action with respect to the average flame flicker or fluctuation frequency as well as power supply frequencies which may be induced in the circuitry.

It is observed that the radiation curves illustrated in FIGURE 3 follow generally the theoretical pattern of radiation from a so-called black body and that such radiation is predominantly from the heated walls of the furnace, the hump 44 contributing in effect only a relatively small portion of the total radiation.

While the hump 44 which is used is due to an emission band of the gas flame, it is conceivable that other portions of the spectrum may be used wherein the intensity of radiation changes rather abruptly with relatively little change in frequency. Such region may, instead of being due to an emission band, be due, for example, to an absorption band of the flame.

While the drawings show a prism as a means for dispersing the incident radiation into a spectrum, it is realized that other radiation dispersing elements may be used in practicing novel concepts herein, for example a diffraction grating suggests itself.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In apparatus of the character described for determining the presence of and controlling a flame which may be obscured by the radiation of bodies heated thereby, and by the sporadic fluctuations in intensity of the flame itself, the combination comprising, means producing said flame which has said fluctuations, means continuously measuring the change in spectral emission of said flame over a continuous frequency range to produce a corresponding continuous number of measurements, means repeating said measurements at a frequency substantially higher than the average frequency at which said sporadic fluctuations occur to derive a control voltage which is independent of said fluctuations, and means controlled by said control voltage for controlling said flame.

2. In apparatus of the character described for determining the presence of and controlling a flame which may be observed by the radiation of bodies heated thereby, and by sporadic fluctuations in intensity of the flame itself, as well as by the frequency of adjacent power supply circuits, the combination comprising, means for producing said flame which has said fluctuations, means continuously measuring the change in spectral emission of said flame over a continuous frequency range to produce a corresponding continuous number of measurements, means repeating said measurements at a frequency substantially higher than the average frequency at which said sporadic fluctuations occur, and at a frequency removed from the fundamental or harmonic frequency of said supply circuits to derive a control voltage which is independent of said fluctuations and of said fundamental or harmonic, and means controlled by said control voltage for controlling said flame.

3. In apparatus for controlling the presence of a flame produced by flame producing means, a body, flame producing means for producing a flame which is present in an enclosure having said body heated by said flame produced by said flame producing means, movable frequency selective means having radiation impinging thereon from both said body and said flame and producing a control voltage only in accordance with a particular band of frequencies of said body and flame radiation, means periodically moving an element of said frequency selective means to impart a corresponding periodic variation to said control voltage, and means controlling said flame producing means in accordance with said control voltage having said periodic variation, said controlling means including means tuned to said periodic variation.

4. In apparatus for controlling the presence of a flame produced by flame producing means, movable frequency selective means having radiation impinging thereon from said flame and producing a control voltage only in accordance with a particular band of frequencies of flame radiation selected by said frequency selective means, means periodically moving an element of said frequency selective means to impart a corresponding periodic variation to said control voltage, and means controlling said flame producing means in accordance with said control voltage having said periodic variation, said controlling means including means tuned to said periodic variation.

5. In apparatus of the character described for determining the presence of a flame which has an emission band in its spectrum wherein the intensity of radiation chages rather abruptly with relatively little change in frequency, means for producing said flame having said emission band, light dispersing means for dispersing radiation from the flame into a spectrum, photocell means, means selecting from said spectrum substantially only that radiation which is characteristic of said emission band of said flame and for applying said selected portion to said photocell, means vibrating said selecting means at a recurrent frequency to develop an output signal in said photocell which varies at said recurrent frequency and at an amplitude determined substantially only in accordance with and in proportion to the amplitude of radiation in said emission band, tuned amplifying means coupled to said photocell and tuned to said recurrent frequency for developing an amplified signal, and voltage responsive means coupled to said amplifying means and controlling said flame.

References Cited in the file of this patent

UNITED STATES PATENTS

| | | |
|---|---|---|
| 2,306,073 | Metcalf | Dec. 22, 1942 |
| 2,339,754 | Brace | Jan. 25, 1944 |
| 2,369,966 | Hawkins | Feb. 20, 1945 |
| 2,459,177 | Moseley | Jan. 18, 1949 |
| 2,494,607 | Bouchet | Jan. 17, 1950 |
| 2,507,359 | Weisz | May 9, 1950 |
| 2,524,100 | Dauviller et al. | Oct. 3, 1950 |
| 2,622,192 | Tarpley | Dec. 16, 1952 |